United States Patent [19]

Biek

[11] Patent Number: 4,813,822
[45] Date of Patent: Mar. 21, 1989

[54] POWER DRILL SYSTEM WITH ADJUSTABLE DEPTH SENSING MEANS

[75] Inventor: Paul A. Biek, Houston, Tex.

[73] Assignee: Dresser Industries, Inc., Dallas, Tex.

[21] Appl. No.: 141,476

[22] Filed: Jan. 5, 1988

[51] Int. Cl.$^4$ ............................................. B23B 45/00
[52] U.S. Cl. .................................... 408/14; 408/137; 408/138
[58] Field of Search ................ 408/14, 137, 138, 141, 408/202, 241 S, 95, 15, 142

[56] References Cited

U.S. PATENT DOCUMENTS

| | | | |
|---|---|---|---|
| 1,305,872 | 6/1919 | Bollie | 408/241 S |
| 3,037,405 | 6/1962 | Steyskal | 408/241 S |
| 3,583,822 | 6/1971 | Alexander et al. | 408/137 |
| 3,762,827 | 10/1973 | Ziegelmeyer | 408/14 |
| 3,767,313 | 10/1973 | Bohoroquez et al. | 408/14 |
| 4,182,588 | 1/1980 | Burkart et al. | 408/14 |
| 4,495,681 | 1/1985 | Eckman | 408/14 |
| 4,557,646 | 12/1985 | Biek | 408/14 |
| 4,591,299 | 5/1986 | Eckman | 408/137 |

Primary Examiner—Gil Weidenfeld
Assistant Examiner—Daniel W. Howell

[57] ABSTRACT

A power drill system the type having a positive drive spindle incorporating an adjustable depth control means mounted on the spindle. The depth control means includes a collar having an internal bore which is provided with threads conforming to the spindle threads. Thus, the collar may be longitudinally adjusted to a desired position on the spindle by rotating the collar relative to the spindle. The collar is provided with a plurality of circumferentially spaced detent chambers. A detent member is secured in at least one of the detent chambers and extends into at least one of the spindle grooves in order to key the collar against rotation relative to the spindle and thus fix the collar at the desired longitudinal location. A thrust bearing assembly is secured to the collar in interposition between the collar and the stop shoulder. Upon contact of the depth sensing means with the stop shoulder, the thrust bearing assembly permits relative rotational movement between the collar and the stop shoulder. In a second embodiment, the depth control means includes primary and secondary collars providing very precise depth control. In either embodiment the depth control unit can be mounted on the drilling end or trailing end into the spindle.

16 Claims, 2 Drawing Sheets

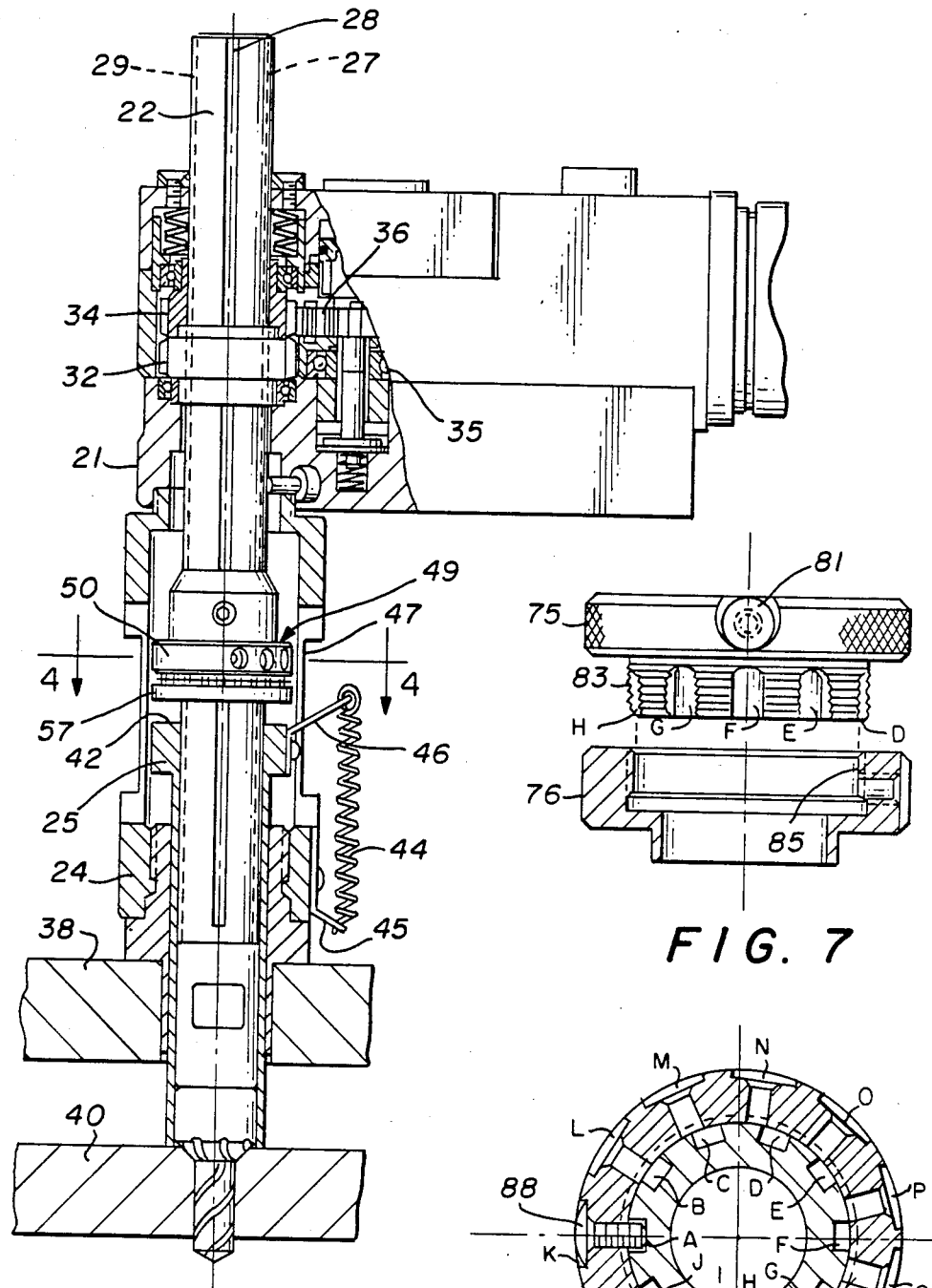
FIG. 2
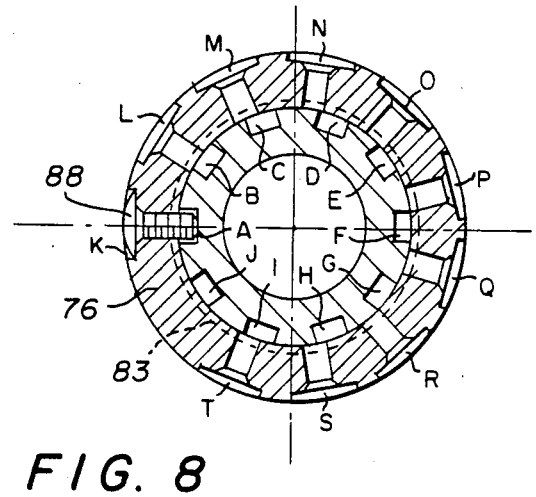
FIG. 7
FIG. 8

POWER DRILL SYSTEM WITH ADJUSTABLE DEPTH SENSING MEANS

TECHNICAL FIELD

This invention relates to power drill systems and more particularly to positive feed drill systems having a drive spindle provided with adjustable depth sensing means.

ART BACKGROUND

Power drilling systems include a positive feed spindle which is equipped at its leading end to support a working tool such as a drill bit, counter sink, or reamer. The spindle is mounted in a drill head housing for both rotational and longitudinal movement and is rotated and advanced or retracted by differential gear systems commonly referred to respectively as spindle drive and spindle feed gear trains. It is a conventional practice to provide the drive spindle with positive action depth sensing means which can be adjusted longitudinally along the length of the spindle. The depth sensing means can initiate one or more of spindle functions upon contact to the depth sensing means with a positive stop shoulder in the spindle housing. For example upon contact of the depth sensing means with the stop shoulder spindle advance or rotation may be stopped or the spindle may be automatically retracted. In addition, contact of the depth sensing means with the stop shoulder may cause the spindle to act by the function of a limited slip coupling in the spindle drive in a dwell mode in which the spindle is rotated without advance in order to ream the surface of a previously drilled hole, as disclosed in U.S. Pat. No. 4,557,646 to Biek.

Various systems are known for adjustably positioning such sensing means along the length of the spindle in order to designate a point of spindle advance at which a desired drilling or control function is initiated. For example U.S. Pat. No. 3,767,313 to Bohoroquez et al discloses a positive feed drill in which the drill spindle is mounted in a drill head housing equipped with a sensing sleeve mounted for telescopic movement in the tool nose. The sensing sleeve is spring biased to project the sleeve out of the tool nose and into contact with a work piece. The slidable sleeve has a stop shoulder which, when the sleeve is in contact with the workpiece, is at a predetermined distance from the workpiece. The spindle is provided with adjustable stop means which upon contact with the stop shoulder of the depth sensing sleeve, causes the spindle to operate in a dwell mode for a few revolutions and then retract. The stop means includes a cylindrical stop and guide member positioned immediately forward of a locating ring which is keyed to the spindle against rotational movement but slides longitudinally of the spindle. The cylindrical member and locating ring are adjustably secured on the spindle by means of two threaded collars, referred to as front and rear lock nuts which are threadably mounted on the spindle to be moved longitudinally along the spindle and locked in place. The front lock nut is of a sufficiently reduced diameter so that it passes through the stop shoulder which is contacted by the cylindrical member to initiate the dwell and retract function.

An improved form of depth control means, also employed to initiate a dwell and retract function, is disclosed in the aforementioned U.S. Pat. No. 4,557,646 to Biek. The adjustable depth control means in Biek is rotatably mounted on the drive spindle by a thrust bearing assemble and includes a post member which is retained on the spindle by a lock ring and has an exteriorly threaded surface provided with a plurality of longitudinal slots. An adjusting sleeve having a lower surface adapted to engage the stop shoulder of the tool is threaded on the exterior surface of the post member and is provided with a plurality of circumferentially spaced radial holes. These holes are threaded to accept a locking screw. The sleeve is rotated relative to the post member to arrive at a desired depth setting and the locking screw then threaded through one of the radial holes and into the appropriate slot in the post member.

Yet a further improved depth control means is disclosed in U.S. Pat. No. 4,495,681 to Eckman. The Eckman system includes an adjustable depth control means comprising a post member and adjusting sleeve in which the threaded connection between these elements is relatively loose so that the adjusting sleeve can float slightly relative to the post member. In Eckman the adjusting screw is relatively short so that when it extends through the adjusting sleeve and into a post member slot, it stops short of riding on the bottom of the slot.

DESCRIPTION OF THE INVENTION

In accordance with the present invention there is provided a power drill system incorporating a new and improved depth control means. The system includes a drive spindle mounted in a drill head housing for longitudinal and rotational movement The spindle has a threaded exterior provided with a plurality of circumferentially spaced grooves extending longitudinally along the spindle The drill head housing is provided with means defining a stop shoulder which is adapted to be contacted by the depth control means. The depth control means includes a collar having an internal bore which is provided with threads conforming to the spindle threads. Thus, the collar may be longitudinally adjusted to a desired position on the spindle by rotating the collar relative to the spindle. The collar is provided with a plurality of circumferentially spaced detent chambers A detent member is secured in at least one of the detent chambers and extends into at least one of the spindle grooves in order to key the collar against rotation relative to the spindle and thus fix the collar at the desired longitudinal location. A thrust bearing assembly is secured to the collar in interposition between the collar and the stop shoulder. Upon contact of the depth sensing means with the stop shoulder, the thrust bearing assembly permits relative rotational movement between the collar and the stop shoulder.

In a preferred embodiment of the invention, the thrust bearing assembly is a roller bearing type and includes an annular thrust plate having an upper surface which provides a thrust race for the roller bearings and a lower thrust surface which is adapted to engage the stop shoulder. The assembly further comprises a mandrel section which extends downwardly from the collar and is provided with retaining means to secure the thrust plate and mandrel in a manner in which the retaining means is not subject to compressive stress imposed upon the thrust plate when it contacts the thrust shoulder.

In yet a further embodiment of the invention, there is provided a power drill system having a drive spindle mounted in a drill housing provided with a stop shoulder as described above. Adjustable depth control means includes a primary collar having a threaded exterior and an internal bore which is threaded to conform to the threads on the exterior of the spindle. Means are provided to secure the primary collar against rotational movement relative to the spindle. The depth control means includes a secondary collar having an internal bore provided with threads conforming to the exterior threads of the primary collar. Thus the secondary collar may be rotated to move it longitudinally relatively to the primary collar. Means are provided to lock the secondary collar against rotational movement relative to the primary collar when the desired depth adjustment is reached. A thrust bearing assembly is secured to the secondary collar at a location interposed between the secondary collar and the stop shoulder.

BRIEF DESCRIPTION OF THE DRAWINGS

FIG. 2 is a side elevation, partly in section, of a portion of a power drill system illustrating one embodiment of the present invention.

FIG. 6 is a side elevation partly in section showing an alternative form of adjustable depth control means and FIG. 7 is an exploded view partly in section showing a portion of the assembly of FIG. 6.

FIG. 8 is a cross-sectional view taken along line 8—8 of FIG. 6.

BEST MODES FOR CARRYING OUT THE INVENTION

Figure 1:
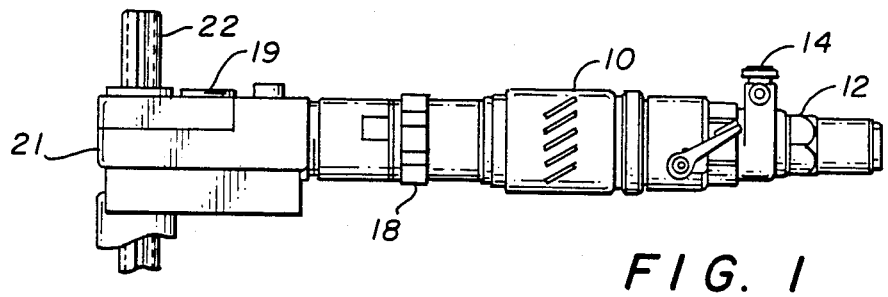
FIG. 1 is a side elevation of a power drill system of the type in which the invention may be used.

FIG. 1 illustrates an automatic positive feed drill of the type combining the invention. The drill is powered by a prime mover 10 which typically takes the form of a pneumatic motor. Air under pressure is supplied to the drill from a suitable source (not shown) through a coupling section 12 having an on-off valve under control of a drill button 14 which is pressed to apply pressurized air to the pneumatic motor.

The output from motor 10 is supplied through a suitable planetary gear drive 18 to a drill head 19. The head 19 includes a housing 21 within which a drive spindle 22 is mounted for reciprocal rotation and longitudinal movement. The drill spindle 22 is rotated and advanced or retracted through the operation of differential gear trains as described below.

FIG. 2 shows details of the spindle 22 as mounted within the drill head housing 21, which includes a tool nose 24 provided with a telescoping depth sensing sleeve 25 as described below. The spindle is provided with external left hand threads and a plurality of grooves 27-30 that extend longitudinally along its length. The spindle 22 extends through a spindle drive gear 32 and a somewhat smaller spindle feed gear 34. The bore of the spindle feed gear is threaded internally to conform with the external threads on the spindle. The bore of the spindle drive gear is provided with internal splines that engage the longitudinal grooves of the spindle so that the spindle drive gear rotates with the spindle but allows the spindle to slide through the gear to either retract it or advance it.

Gears 32 and 34 are driven by gears 35 and 36, respectively, which are releasably coupled together for conjoint rotation Gear 35 is somewhat smaller than gear 36 consistent with the desired gear ratio differential between the spindle drive and spindle feed gear trains.

As noted previously, the feed gear 34 functions to advance the spindle toward the work piece or to retract the spindle at the conclusion of the drilling operation. When feed gear 34 rotates faster than the spindle, as normally will be the case because of the relatively low gear ratio of the feed gear train in relation to the ratio of drive gear train, the spindle advances in the feed direction. The rate of advance is of course dependent upon the differential in gear ratios between the spindle drive and spindle feed gear trains. When the spindle feed gear rotates slower than the spindle, spindle movement is reversed and the spindle is retracted away from the workpiece. This typically is accomplished by moving gear 36 upwardly relative to gear 35 by suitable disengagement means (not shown) to decouple gears 35 and 36. Upon disengagement, gear 36 is held stationary causing the spindle to retract at a relatively fast rate. For a further description of the positive feed drill and its operation to retract and advance the spindle, reference is made to U.S. Pat. No. 4,591,299 to Eckman, the entire disclosure of which is incorporated herein by reference.

Returning to FIG. 2, the tool nose 24 of the drill head housing is secured to a tool plate 38 which in turn is spaced from a workpiece 40 in which holes are being drilled. The sensing sleeve 25 is slidably disposed within the tool nose and surrounds the spindle. The upper surface 42 of the sensing sleeve functions as a stop shoulder for the hereinafter described depth sensing means. A tension spring 44 is connected between a lug 45 secured to the outer surface of the housing 24 and a lug 46 secured to the sleeve 25 and extending to the exterior of the housing through a slot 47 therein. As can be seen from an examination of FIG. 2, spring 44 biases the depth sensing sleeve against the workpiece 40 so that the stop shoulder 42 is a known, fixed distance from the surface of the workpiece.

An adjustable depth control assembly 49 is mounted on the spindle 22 so that it contacts the shoulder 42 at the desired spacing from the work piece to provide an appropriate control function. Such control function can include dwell and retract operation as described in the aforementioned patent to U.S. Pat. No. 4,557,646 to Biek, the entire disclosure of which is incorporated herein by reference.

Figure 4:
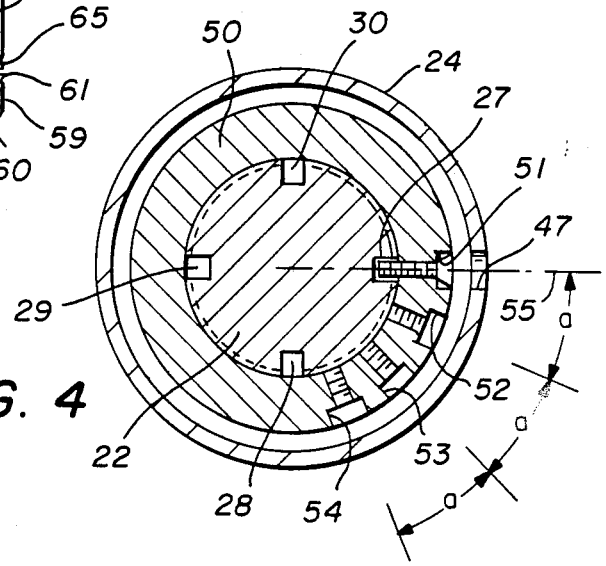
FIG. 4 is a cross-sectional view taken along line 4—4 of FIG. 2.

The adjustable depth control unit which is secured on the spindle 22 in accordance with the present invention provides a rugged compact assembly which can be easily adjusted. The depth control means includes a collar 50 which is threadably mounted on the spindle and provided with a plurality of circumferentially spaced detent chambers such as may be formed by drilling holes 51-54 radially through the collar, as best shown in FIG. 4. The holes 51-54 are tapped and, as shown in FIG. 4, the appropriate hole may be lined up with a slot in the spindle 22 and a set screw 55 inserted to secure the collar at a desired location on the spindle In the embodiment illustrated, the internal bore of the collar 50 and the spindle are threaded at 12½ threads to the inch. Thus, one complete rotation on the collar on the spindle will advance or retract the collar along the spindle by a distance of 0.08 inch. The angle a between each successive pair of the holes 51-52 is 22.5° so that, given there are four slots in the spindle, the collar may be incremented on the spindle to a resolution of 1/16 of a turn, or an adjustment of 0.005 inch per increment.

From an examination of FIG. 4, it will be recognized that the precision by which the collar 50 is adjustable can be improved by increasing the number of detent chambers in a segment of the collar between adjacent slots in the spindle. For example, by providing five holes at an angular spacing a (FIG. 4) of 18°, the adjustment resolution can be increased to 1/20 of a turn, providing an adjustment of 0.004 inch per increment. Also, if it is desired to secure the collar to the spindle by more than one set screw, additional holes at the appropriate angular spacing can be drilled in another segment of the collar. For example, and with reference to the configuration shown in FIG. 4, four additional holes each spaced respectively by 180° from the holes shown can be drilled in collar 50 and a second screw inserted through the appropriate hole into slot 29.

Figure 3:
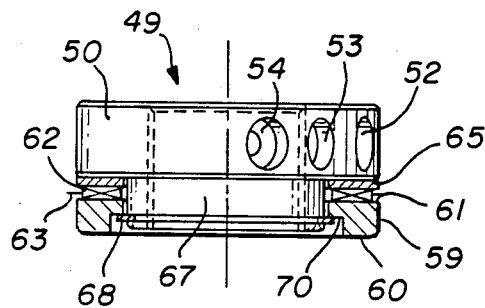
FIG. 3 is a side elevation, partly in section, of the adjustable depth control means shown in FIG. 2.

The control means further includes a thrust bearing unit 57 secured to the collar to permit rotation of the collar relative to the stop shoulder when the control means abuts the shoulder. As best shown in FIG. 3, the thrust bearing assembly includes an annular thrust plate 59. The bottom surface 60 of plate 59 provides a thrust surface to engage the shoulder 42. The upper surface 61 of the thrust plate provides a lower thrust race for roller bearings 62 which are held in place by a bearing cage ring 63. A second member 65 provides an upper bearing race and abuts against the underside of collar 50. Although the lower annular surface of the collar 50 can be machined to provide the upper bearing race, the arrangement illustrated is preferred in order to allow the thrust bearing to be easily replaced as a unit while still retaining use of the old collar element.

The thrust plate 59 is supported on the collar member by means of a reduced mandrel section 67 which extends downwardly from the enlarged collar portion into the bore of the annular thrust plate. The lower section of the mandrel 67 is provided with a circumferential groove within which a retaining ring 68 fits to provide a radially extending shoulder which supports the thrust plate by abutment against a recessed lower surface 70. As can be seen from an examination of FIGS. 2 and 3, the retaining ring fitting into the recessed surface of the thrust plate is free of any contact between the thrust plate and the stop shoulder surface 42 when the mandrel reaches the maximum feed position where the bottom of the thrust plate abuts the stop shoulder. Thus, the retaining means 68 is not subject to compressive stress imposed upon the thrust plate. This stress is instead entirely carried by the thrust bearing assembly This arrangement permits an engagement between the stop shoulder and the depth control unit which for all practical purposes is friction free so that the mandrel can be operated at a dwell condition for prolonged periods of time, if necessary, without imposing undue torque in the collar, spindle, or drive train components. The roller bearing assembly, which permits bearing contact over a substantial portion of the thrust races of the thrust plate 59 and member 65, provides a rigid bearing structure having substantially greater depth control accuracy than would be the case if ball bearings were employed. Also, the relatively short axial length of the overall depth control assembly permits the spindle and depth sensing sleeve to be relatively short. This is highly advantageous where close quarter drilling is encountered such as in the manufacture of aircraft components and the like. In addition, since the roller bearings rotate with the spindle, chips and debris which might otherwise enter between the bearing elements are thrown outwardly by centrifugal force. This reduces the likelihood of bearing damage and provides for enhanced repeatability and depth sensing accuracy.

Figure 5:
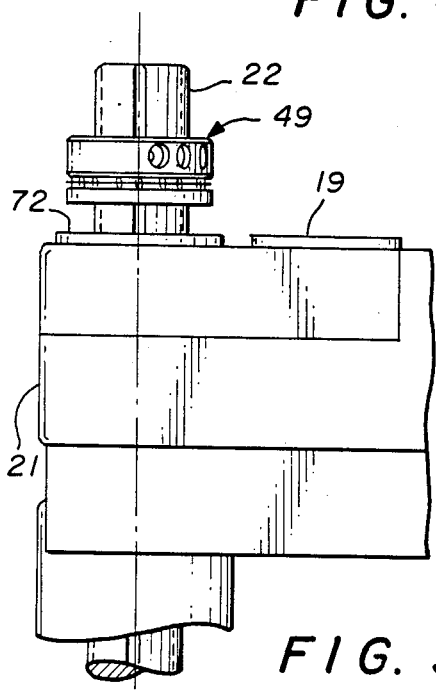
FIG. 5 is a side elevation of a portion of a power drill system embodying adjustable depth control means of the present invention at an alternative location in the drill system.

In an alternative embodiment of the invention, the depth control means can be located on the trailing end of the spindle. This embodiment of the invention is illustrated in FIG. 5. The adjustable depth control unit itself is identical to that described previously. In this case, the stop shoulder against which the unit abuts to limit spindle movement can be formed by providing a precision ground surface 72 at the top of the drill head housing.

Figure 6:
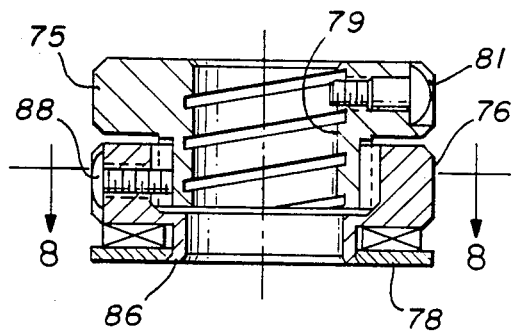

FIGS. 6, 7 and 8 illustrate another embodiment of the invention which can be employed to provide even finer incremental adjustments of the depth control means on the spindle. In FIG. 6, only the depth control unit itself is illustrated without the spindle and remainder of the drill head housing being shown. However, it will be recognized that the mechanism illustrated in FIG. 6 can be mounted on the spindle 22 at the drilling end as in FIG. 2 or at the trailing end as in FIG. 5.

As shown in FIG. 6, the depth control means of this embodiment of the invention comprises a primary collar 75, a secondary collar 76, and a thrust bearing assembly 78 secured to the secondary collar and interposed between the secondary collar and the stop shoulder such as surface 42 in FIG. 2 or surface 72 in FIG. 5. The primary collar 75 has an internal bore which is tapped to provide threads 79 conforming to the threads on the exterior of the spindle. The primary collar also is provided with means to lock it against rotational movement relative to the spindle. In the embodiment illustrated, a single tapped hole is provided through the collar 75 and fitted with a set screw 81 extending into one of the spindle slots. However it will be recognized that several such threaded holes can be provided similarly as in the case of element 50 in the embodiment of FIGS. 2-4. The primary collar preferably is of a post type construction, as best shown in FIG. 7, with the post section 83 having a threaded exterior and a plurality of circumferentially spaced slots A through J providing detent recesses. The secondary collar 76 has an internal bore 85 which is threaded in a manner to conform to the threads on the exterior of the post section of the primary collar. Thus, incremental adjustment of the depth control means can be accomplished by rotation of the primary collar on the spindle and by rotation of the secondary collar on the primary collar. Attached to the secondary collar is a thrust bearing unit 78 which may be identical to a thrust bearing described above with reference to FIG. 3. As shown in FIG. 6, the radial retaining shoulder supporting the thrust plate to the secondary collar is provided by crimping the lower end of the secondary collar as indicated by reference numeral 86 so that it extends into the recessed surface of the bearing unit thrust plate. It will be recognized, however, that such shoulder can be provided by a retaining ring similarly as shown in FIG. 3.

The secondary collar 76 is secured against rotational movement relative to the primary collar by means of a detent member secured in at least one of a plurality of detent chambers in the secondary collar and extending into one of the detent recesses on the post section of the primary collar. As in the case described previously, the detent chambers may be provided simply by drilling and tapping radial holes extending through the wall of the secondary collar and securing one or more set screws in the threaded holes to extend into the detent slots in the post section of the primary collar. An arrangement of the slots in post member 83 and the holes in secondary collar 76 similar to that disclosed in the aforementioned U.S. Pat. No. 4,557,646 to Biek can be employed to provide very precise incremental depth adjustments. This arrangement is best illustrated in FIG. 8. As shown in FIG. 8, the slots A–J in the post member 83 are equally spaced throughout the circumference of the post member to provide an angular space in between adjacent slots of 36°. The 10 holes K–T are angularly spaced from one another by 32.4°. This enables the secondary collar to be adjusted relative to the primary collar in increments of 1/100 of a turn. Thus as shown in FIG. 8, set screw 88 extends through hole K into detent slot A to hold the primary and secondary collars in a locked position. By turning the secondary collar 3.6° relative to the primary collar, hole L and slot B will be lined up and the set screw inserted here to lock the collars together.

Having described specific embodiments of the present invention, it will be understood that modification thereof may be suggested to those skilled in the art, and it is intended to cover all such modifications as fall within the scope of the appended claims.

I claim:

1. In a power drill system, the combination comprising
   (a) a drill head having a housing;
   (b) a spindle having a drilling end adapted to support a work tool and mounted in said housing for reciprocal and rotational movement, said spindle having a threaded exterior provided with a plurality of circumferentially spaced grooves extending longitudinally along said spindle;
   (c) means in said housing defining a stop shoulder adjacent to said spindle and radially spaced from the circumference of said spindle;
   (d) adjustable depth control means mounted on said spindle adapted to contact said stop shoulder to control movement of said spindle and including:
      a collar having an internal bore provided with threads conforming to the threads on the exterior of said spindle whereby said collar may be rotated relative to said spindle to longitudinally adjust the position of said collar along the length of said spindle;
      at least one detent chamber in said collar;
      a detent member secured in said at least one detent chamber and extending into one of said longitudinal grooves in said spindle to secure said collar against rotational movement relative to said spindle whereby said collar rotates with said spindle; and
      a thrust roller bearing assembly secured to said collar and rotatable therewith, said bearing assembly being interposed between said collar and said stop shoulder to permit rotational movement of said collar relative to said stop shoulder upon contact of said depth control means with said stop shoulder.

2. The combination of claim 1 wherein said housing includes a nose section through which the drilling end of said spindle extends and wherein said stop shoulder is in the nose section of said housing and said depth control means is mounted adjacent the drilling end of said spindle.

3. The combination of claim 2 wherein said nose section includes a depth sensing sleeve slideably disposed within said nose section and adapted to project from said nose section to engage a workpiece and wherein said stop shoulder is formed on said depth sensing sleeve.

4. The combination of claim 1 wherein the trailing end of said spindle projects externally from the rear end of said housing and wherein said depth control means is located on the trailing end of said spindle externally of said housing.

5. In a power drill system, the combination comprising:
   (a) a drill head having a housing;
   (b) a spindle having a drilling end adapted to support a work tool and mounted in said housing for reciprocal and rotational movement, said spindle having a threaded exterior;
   (c) means in said housing defining a stop shoulder adjacent to said spindle and radially spaced from the circumference of said spindle;
   (d) adjustable depth control means mounted on said spindle adapted to contact said stop shoulder to control movement of said spindle and including:
      a primary collar having a threaded exterior and internal bore provided with threads conforming to the threads on the exterior of said spindle whereby said collar may be rotated relative to said spindle to longitudinally adjust the position of said collar along the length of said spindle;
      means for securing said primary collar against rotational movement relative to said spindle;
      a secondary collar having an internal bore provided with threads conforming to the threads on the exterior of said primary collar whereby said secondary collar may be rotated relative to said primary collar to move said secondary collar longitudinally relative to said primary collar;
      means for securing said secondary collar against rotational movement relative to said primary collar; and
      a thrust bearing assembly secured to said secondary collar and interposed between said secondary collar and said stop shoulder to permit rotational movement of said primary and secondary collars relative to said stop shoulder upon contact of said depth control means with said stop shoulder.

6. The combination of claim 5 wherein said primary collar comprises a plurality of circumferentially spaced detent recesses on the outer surface thereof and said secondary collar has a plurality of detent chambers at circumferentially spaced locations and said means for securing said secondary collar against rotational movement relative to said primary collar includes a detent member secured in at least one of said detent chambers and extending into one of said detent recesses.

7. The combination of claim 6 wherein said means for securing said primary collar against rotational movement relative to said spindle comprises a detent member extending from said primary collar into one of said grooves in said spindle.

8. The combination of claim 5 wherein said thrust-bearing assembly includes an annular thrust plate having an upper surface providing a thrust race for said thrust-bearing assembly and a lower thrust surface adapted to engage said stop shoulder and further comprising a mandrel section depending from said collar and retaining means for securing said thrust plate and said mandrel in a manner in which said retaining means is not subject to compressive stress imposed upon said thrust plate upon contact with said stop shoulder.

9. The combination of claim 8 wherein said retaining means comprises a radially extending shoulder secured to said mandrel section and supporting said thrust plate by contact with a lower surface of said thrust plate which is free of contact between said stop shoulder and said thrust plate surface.

10. The combination of claim 6 wherein said thrust-bearing assembly comprises a plurality of roller bearings.

11. The combination of claim 5 wherein said housing includes a nose section through which the drilling end of said spindle extends and wherein said stop shoulder is in the nose section of said housing and said depth control means is mounted adjacent the drilling end of said spindle.

12. The combination of claim 5 wherein the trailing end of said spindle projects externally from the rear end of said housing and wherein said depth control means is located on the trailing end of said spindle externally of said housing.

13. In a power drill system, the combination comprising
  (a) a drill head having a housing;
  (b) a spindle having a drilling end adapted to support a work tool and mounted in said housing for reciprocal and rotational movement, said spindle having a threaded exterior provided with a plurality of circumferentially spaced grooves extending longitudinally along said spindle;
  (c) means in said housing defining a stop shoulder adjacent to said spindle and radially spaced from the circumference of said spindle;
  (d) adjustable depth control means mounted on said spindle adapted to contact said stop shoulder to control movement of said spindle and including:
    a collar having an internal bore provided with threads conforming to the threads on the exterior of said spindle whereby said collar may be rotated relative to said spindle to longitudinally adjust the position of said collar along the length of said spindle;
    a plurality of detent chambers at circumferentially spaced locations in said collar;
    a detent member secured in at least one of said detent chambers and extending into one of said longitudinal grooves in said spindle to secure said collar against rotational movement relative to said spindle; and
    a thrust bearing assembly secured to said collar and interposed between said collar and said stop shoulder to permit rotational movement of said collar relative to said stop shoulder upon contact of said depth control means with said stop shoulder, said thrust bearing assembly including an annular thrust plate having an upper surface providing a thrust race for said thrust-bearing assembly and a lower thrust surface adapted to engage said stop shoulder and further comprising a mandrel section depending from said collar and retaining means for securing said thrust plate and said mandrel in a manner in which said retaining means is not subject to compressive stress imposed upon said thrust plate upon contact with said stop shoulder.

14. The combination of claim 13 wherein said retaining means comprises a radially extending shoulder secured to said mandrel section and supporting said thrust plate by contact with a lower surface of said thrust plate which is free of contact between said stop shoulder and said thrust plate surface.

15. The combination of claim 13 wherein said thrust-bearing assembly comprises a plurality of roller bearings.

16. In a power drill system, the combination comprising
  (a) a drill head having a housing, said housing comprising a downwardly extending nose section;
  (b) a spindle having a drilling end extending through said nose section and adapted to support a work tool and mounted in said housing for reciprocal and rotational movement, said spindle having a threaded exterior provided with a plurality of circumferentially spaced grooves extending longitudinally along said spindle;
  (c) means in said nose section defining a stop shoulder adjacent to said spindle and radially from the circumference of said spindle;
  (d) adjustable depth control means mounted on the drilling end of said spindle adapted to contact said stop shoulder to control movement of said spindle and including:
    a collar having an internal bore provided with threads conforming to the threads on the exterior of said spindle whereby said collar may be rotated relative to said spindle to longitudinally adjust the position of said collar along the length of said spindle;
    a plurality of detent chambers at circumferentially spaced locations in said collar;
    a detent member secured in at least one of said detent chambers and extending into one of said longitudinal grooves in said spindle to secure said collar against rotational movement relative to said spindle; and
    a thrust bearing assembly secured to said collar and interposed between said collar and said stop shoulder to permit rotational movement of said collar relative to said stop shoulder upon contact of said depth control means with said stop shoulder.

* * * * *